STABILIZED SERVO SYSTEM

Filed Nov. 10, 1959

2 Sheets-Sheet 1

INVENTORS.
WILLIAM H. WOODWORTH
JACK A. CRAWFORD

June 8, 1965 W. H. WOODWORTH ETAL 3,188,482

STABILIZED SERVO SYSTEM

Filed Nov. 10, 1959 2 Sheets-Sheet 2

INVENTORS.
WILLIAM H. WOODWORTH
JACK A. CRAWFORD

United States Patent Office 3,188,482
Patented June 8, 1965

3,188,482

STABILIZED SERVO SYSTEM

William H. Woodworth and Jack A. Crawford, China Lake, Calif., assignors to the United States of America as represented by the Secretary of the Navy Filed Nov. 10, 1959, Ser. No. 852,155
1 Claim. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an electrical servo system and more particularly to a transistor amplifier circuit for increasing the efficiency and for eliminating the hunting of the system.

In follow-up electrical servo systems, an initial signal is applied to a synchro transmitter, the output of which is applied to a synchro control transformer. The output signal of the control transformer is amplified and applied to a motor which returns the rotor of the control transformer to its null position. Due to the inertia of the mechanical components, the motor and control transformer rotor tend to overdrive beyond the null position, thereby resulting in system oscillations or hunting unless overcome in some manner. Also, with conventional transistor amplifiers, difficulty has been encountered in obtaining high efficiency in the output stage. It should be recognized that one of the principal problems associated with higher power transistor circuitry is efficiency, because for a given output power, the efficiency of the device determines how much power is dissipated within the circuitry and particularly within the transistors. The power dissipated within a transistor in conjunction with the ambient or surrounding environment temperature determines the total temperature rise of the transistor, which is of considerable concern because transistors are highly temperature-sensitive with regard to performance and lifetime.

Prior to the present invention, one method for electrically eliminating hunting was performed by the circuitry design of vacuum tube amplifiers. In such systems wherein all of the electrical information is in the form of a phase reversible variable amplitude carrier, the addition of a significant system time constant becomes very difficult. Quite frequently, tachometers or complicated demodulator-filter-modulator systems are used. The efficiency of prior amplifiers has been increased by complicated circuit design or refined vacuum tube or transistor design.

The present invention overcomes servo system hunting by rectifying some of the amplifier output signal filtering this signal with a suitable time constant and feeding it back in series with an opposed voltage of preselected magnitude as a so-called "delayed" D.C. voltage to the input stage of the amplifier in such a manner that the amplification factor is small while the input signal is relatively small and is approaching its null. The time constant is selected so that the inertia of the system will return the system to its null, without overshooting, prior to removal of the D.C. feedback voltage. The efficiency of the output stage of the amplifier is increased by applying to the transistors a pulsating D.C. supply voltage that has the same frequency as does the transistor input signal.

An object of the invention is to obtain a highly efficient electrical servo system transistor amplifier.

Another object is to provide electrical damping of a servo system to eliminate hunting and oscillations.

Another object is to supply the transistors of a class B amplifier with sinusoidal pulsating D.C. thereby increasing its efficiency and maintaining the transistors at a minimum temperature.

Another object is to increase the performance and life of transistors in amplifiers.

Another object is to feed back a D.C. signal to the emitter of a first stage in a transistor amplifier of an electrical servo system thereby preventing hunting or oscillations.

Another object is to supply a phase reversible A.C. signal of substantially sinusoidal form to the load of an electrical closed loop follow-up servo system with high efficiency and by means of circuit arrangements to provide electrical damping of the system to eliminate hunting and oscillations.

Another object is to increase the efficiency of a transistor amplifier by changing the D.C. supply voltage to the transistor periodically with applied signal.

Other objects and many of the attendant advantages of this invention will be readily appreciated as the same become better understood by reference to the following detailed description when considered in connection with the accompanying drawings wherein.

Figure 1:
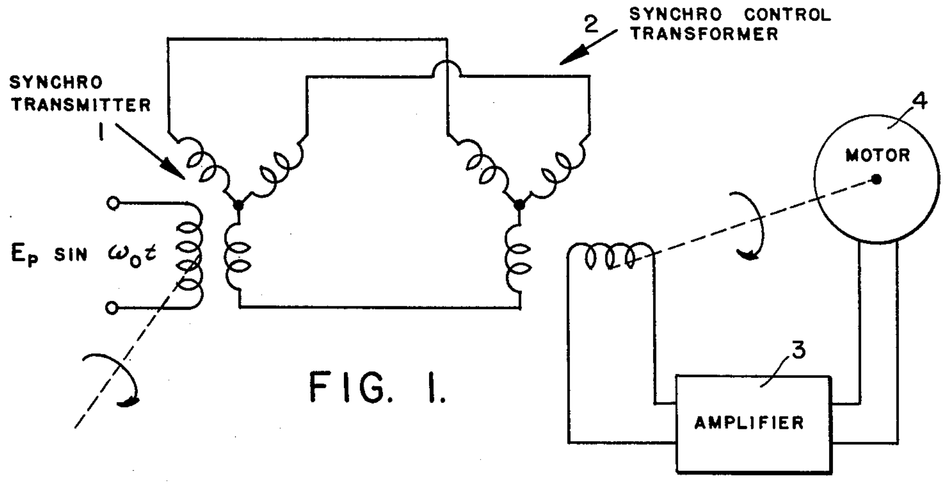
FIG. 1 is a schematic diagram of a closed-loop follow-up servo system.

Referring now to FIG. 1 of the drawings, a pair of synchros 1 and 2 are employed which compare the relative positions of two rotatably mounted shafts and present a position error as a carrier-frequency voltage, the amplitude of which represents the magnitude and the phase represents the sense of the error. Each synchro has a three-winding stator and a single winding rotor. The input voltage $E_p \sin \omega_0 t$ to the rotor of the synchro transmitter 1 induces voltages in the stator thereof in accordance with the relative position of the rotor and stator. These induced voltages are applied to the stator of the synchro control transformer 2 which induces a component into its rotor. The rotor output signal, which may be expressed as $E_s \sin \omega_0 t$ for a given sense of rotor position error, is applied as an error signal to amplifier 3, the output of which is applied to motor 4. The shaft of motor 4 is mechanically connected to the rotor of control transformer 2, the direction of rotation depending upon the phase applied to the motor. Angular rotation is terminated when the rotor of the control transformer is sufficiently displaced so that no voltage is induced therein, this being the follow-up action of the system.

Figure 2:
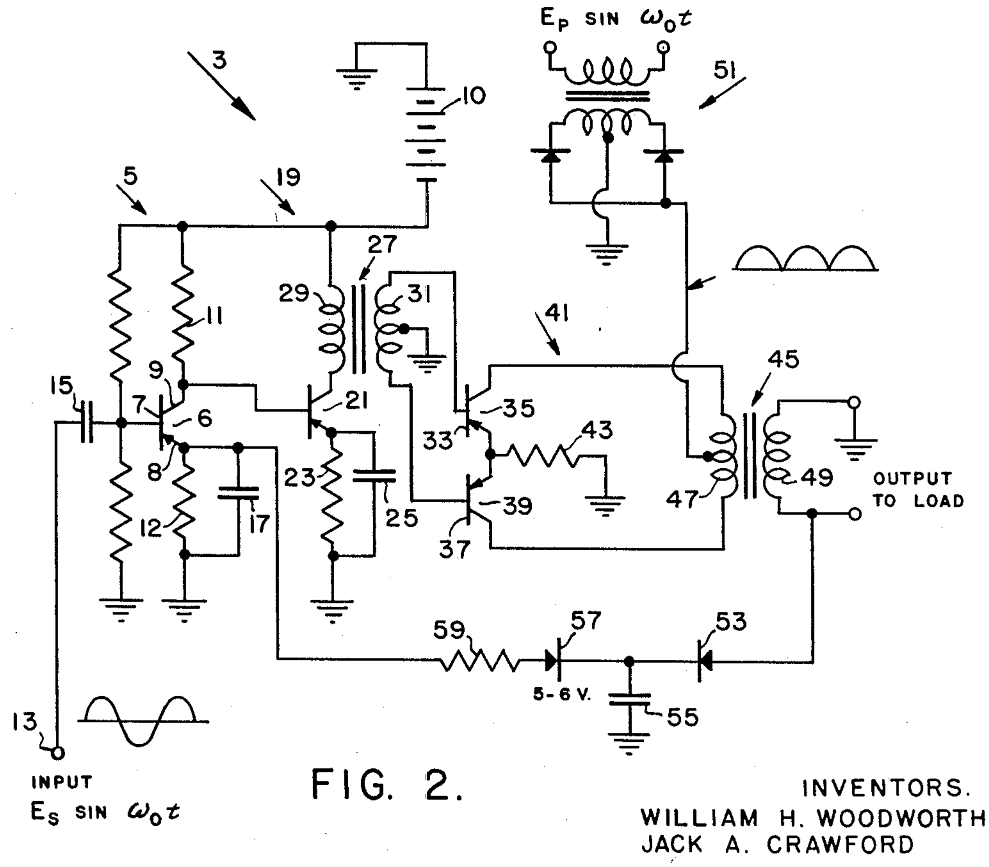
FIG. 2 is a schematic diagram of the amplifier of the servo system shown in FIG. 1.

Referring now to FIG. 2 of the drawings, the first stage 5 of the transistor amplifier comprises a transistor having a base 7, an emitter 8, and a collector 9. A negative D.C. bias 10 is applied to the collector through resistor 11, a positive D.C. bias is applied to the emitter through resistor 12. The error signal applied to input terminal 13 is connected in series with capacitor 15 to the base and is amplified by the transistor. Condenser 17 is provided to by-pass the input signal around resistor 12. The second stage 19 of the amplifier comprises a transistor 21, resistor 23, capacitor 25 and a coupling transformer 27. The output of the first stage is applied to the base of the second stage transistor wherein it is amplified and then applied to the primary 29 of coupling transformer 27. The secondary 31 of the coupling transformer is grounded at mid-point and one end of the secondary is connected to base 33 of transistor 35 and the opposite end is connected to base 37 of transistor 39. The third stage 41 of the amplifier is of class B type and comprises transistors 35 and 39, wherein the emitter of each transistor is connected through resistor 43 to ground. The collector of transistor 35 is connected to one end of primary 47 of transformer 45 and the collector of transistor 39 is connected to the opposite end. Power output of the third stage is taken from secondary 49 of transformer 45.

The input to full-wave rectifier 51 is an A.C. sinusoidal signal having the same frequency as the input error signal to the first stage 5 of the amplifier. The output of rectifier 51 is a sinusoidal pulsating D.C. wherein the time period of two pulses is the same as the time period for a complete cycle of the A.C. input to the first stage or the input to the third stage. Rectifier 51 is connected to the center of primary 47. The direction of the sinusoidal pulsating D.C. flow in primary 47 depends upon whether transistor 35 or 39 is conducting; these transistors conduct when the bases thereof are driven negative by the signal from secondary 31 of transformer 27. A signal voltage across the secondary 31 will at a given half cycle result in a negative going signal applied to base 33 and a positive going signal applied to base 37. During this condition, transistor 35 is conducting and transistor 39 is nonconducting; however, during the next half cycle, when the signal is positive going, transistors 35 and 39 are nonconducting and conducting, respectively.

During that period when transistor 35 is conducting and transistor 39 is nonconducting, the D.C. sinusoidal pulse flows from ground, through resistor 43, transistor 35 and the upper half of primary 47. The output signal of secondary 49 is approximately sinusoidal and positive. During that period when transistor 35 is nonconducting and transistor 39 is conducting, the D.C. sinusoidal pulse flows from ground, through resistor 43, transistor 39 and the lower half of primary 47. In this case the output signal of secondary 49 is sinusoidal and negative since the current flow in secondary 47 is in the opposite direction from that when transistor 35 is conducting. Therefore, the output is sinusoidal A.C. having the same frequency as the input error signal. The amplitude of the A.C. signal at secondary 49 varies as a function of the amplitude of the signal at bases 33 and 37 of transistors 35 and 39, respectively. The phase of the amplifier output signal reverses in accordance with phase reversal of the error signal.

Figure 3:
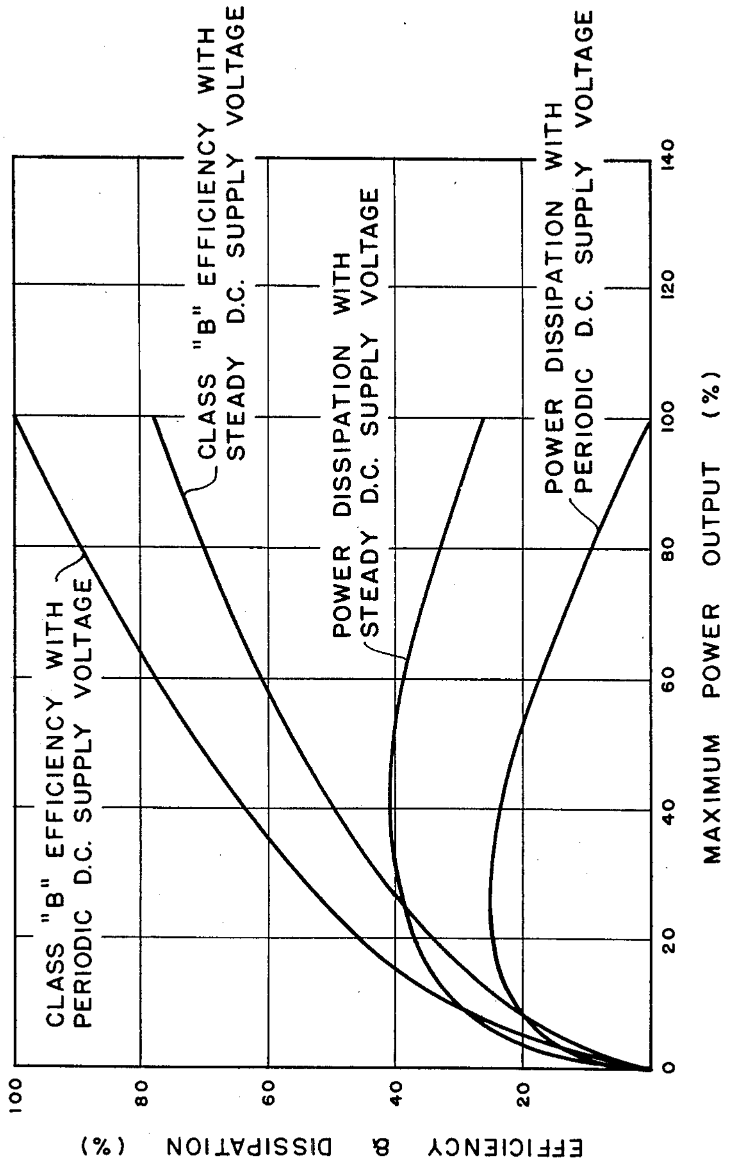
FIG. 3 illustrates curves comparing the efficiency and power dissipation of conventional class B amplifiers with the present invention.

The curves shown in FIG. 3 illustrate that the efficiency obtained with a periodically varying supply is greater than that of steady D.C. supply during all power output conditions, the corollary being that power dissipation is less using periodic supply as shown by the two lowermost curves. From FIG. 3 it can be seen that at maximum power output, using a constant D.C. supply and a sinusoidal transistor input signal, the maximum obtainable efficiency is approximately 78% whereas an efficiency of 100% is obtained when the D.C. supply is a pulsating signal having the same shape and amplitude as the output signal.

FIG. 3 was plotted from the following equations of dissipation and efficiency. For the class B stage with steady D.C. supply voltage:

$$D=\frac{4}{\pi}\sqrt{P}-P$$

$$E=25\pi\sqrt{P}$$

For the class B stage with periodic D.C. supply $$D=\sqrt{P}-P$$

$$E=100(\sqrt{P})$$

D is the dissipation as a fraction of the maximum power output. E is the efficiency in percent and P is the power output as a fraction of the maximum power output.

In order to eliminate hunting in the system, A.C. current is tapped from secondary 49 of transformer 45 and is converted to D.C. by means of rectifier 53. Capacitor 55, the function of which is hereinafter described, is connected between the output of rectifier 53 and ground. The outputs of rectifier 53 and capacitor 55 are applied to low-voltage silicon junction diode 57, the output of which is connected in series with resistor 59 to emitter 8 of the first stage transistor. Low-voltage diode 57 is inserted in the D.C. path so that no feedback is applied to emitter 8 until the output voltage reaches a predetermined level. The well-known "zener" or reverse conduction voltage determines the amount of feedback delay voltage. This feedback delay is generally necessary in order to maintain high amplifier gain during low output conditions.

Upon introducing the error signal into the amplifier, there is an immediate sensing and amplification of the signal by the first stage of the amplifier. However, due to the inertia of the system, the follow-up action of the motor is not immediate. When the input signal is reducing and reaches the null, there is still rotation of the motor and control transformer due to inertia, tending to cause over-shooting and hunting. This hunting effect is overcome by employing a feedback to emitter 8 of the first stage transistor. Capacitor 55, zener diode 57 and resistor 59 affect the duration and magnitude of the feedback signal applied to emitter 8. The characteristics of the capacitor are selected so that complete discharge is not obtained until the null position has been reached, which results in a large D.C. voltage being applied to the emitter while approaching the null, thereby turning the transistor more "on" (approaching the saturation state) and increasing the conduction which results in a reduction in gain. Therefore, the amplification factor of the transistor is very small and the output signal across the emitter and collector is reduced to a minimum while approaching the null. The delayed follow-up signal is neutralized and the system is prevented from overshooting the null position. Therefore, hunting or system oscillation is reduced to a minimum.

Obviously, many modifications and variations of the present invention are possible in the light of the above teachings. For example, vacuum tube circuitry could be used in place of the disclosed transistor circuitry, waveforms other than sinusoidal could be used for input and supply signals and different type transistors could be used with slight circuit modifications. It is therefore to be understood that, within the scope of the appended claim, the invention may be practiced otherwise than as specifically described.

What is claimed is:

A stabilized servo system comprising, in combination:

(a) an output member subject to position error;

(b) means providing an error signal which is phase-reversible and variable in amplitude in accordance with the sense and magnitude, respectively, of said position error;

(c) an error signal amplifier comprising an input stage and an output stage;

(d) said output stage providing an output voltage reversible in phase in accordance with said error signal;

(e) said input comprising a transistor including an emitter electrode and having its amplification variable inversely with the magnitude of a feedback delay voltage applied to said emitter electrode;

(f) means responsive to and controlled by said output voltage to drive said output member toward a null position at which said error signal reduces to zero value;

(g) rectifier means for deriving from said output voltage a unipolar voltage varying in magnitude directly with said output voltage; and (h) circuit means including a series-connected zener diode for deriving from said unipolar voltage and applying to said emitter electrode said feedback delay voltage.

(References on following page)

References Cited by the Examiner

UNITED STATES PATENTS

| | | | |
|---|---|---|---|
| 1,979,036 | 10/34 | Hammond | 330—22 |
| 2,821,674 | 1/58 | Hughes | 318—220 |
| 2,832,017 | 4/58 | Evans | 318—28 |
| 2,832,034 | 4/58 | Lilien Stein et al. | 307—88.5 |
| 2,846,636 | 8/58 | Boyle et al. | 307—88.5 |
| 2,847,519 | 8/58 | Aronson | 179—171 |
| 2,855,551 | 10/58 | McCarthy | 318—28 |
| 2,864,985 | 12/58 | Beck | 307—88.5 |
| 2,885,498 | 5/59 | Bruck et al. | 330—26 |
| 2,911,545 | 11/59 | Pinckaers | 307—88.5 |
| 2,912,654 | 11/59 | Hansen | 330—26 |
| 2,917,694 | 12/59 | Ashcraft | 307—88.5 |
| 2,956,222 | 10/60 | Hill et al. | 323—89 |
| 2,972,064 | 2/61 | Hurlbut | 307—88.5 |
| 3,101,453 | 8/63 | Simpson et al. | 330—22 |

JOHN W. HUCKERT, *Primary Examiner.*

HERMAN K. SAALBACH, GEORGE N. WESTBY, *Examiners.*